Figure 9:
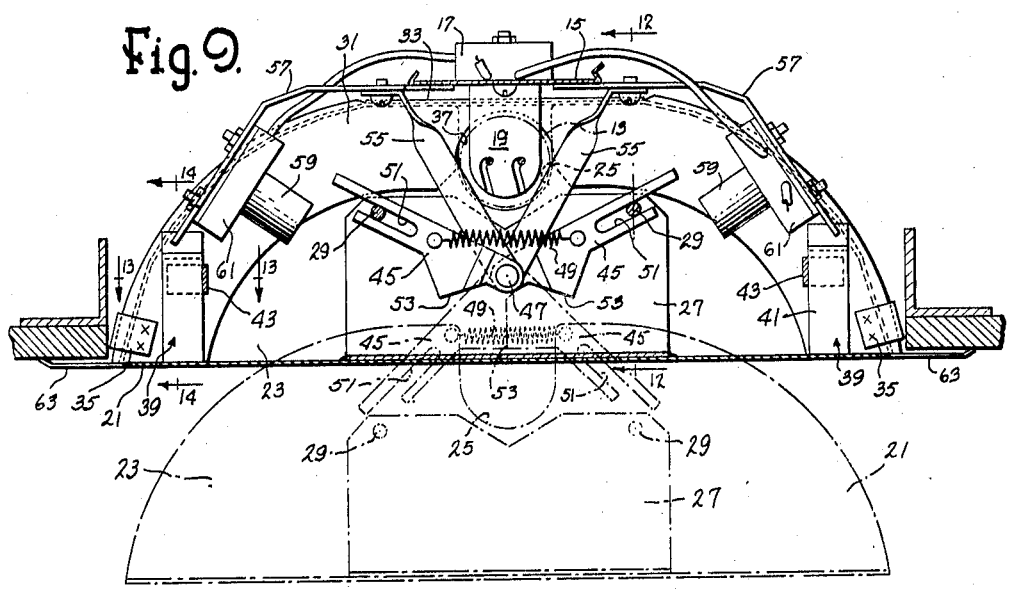

Jan. 11, 1944.  R. B. NETTING  2,339,100
LIGHT FIXTURE
Filed April 28, 1941  4 Sheets-Sheet 1
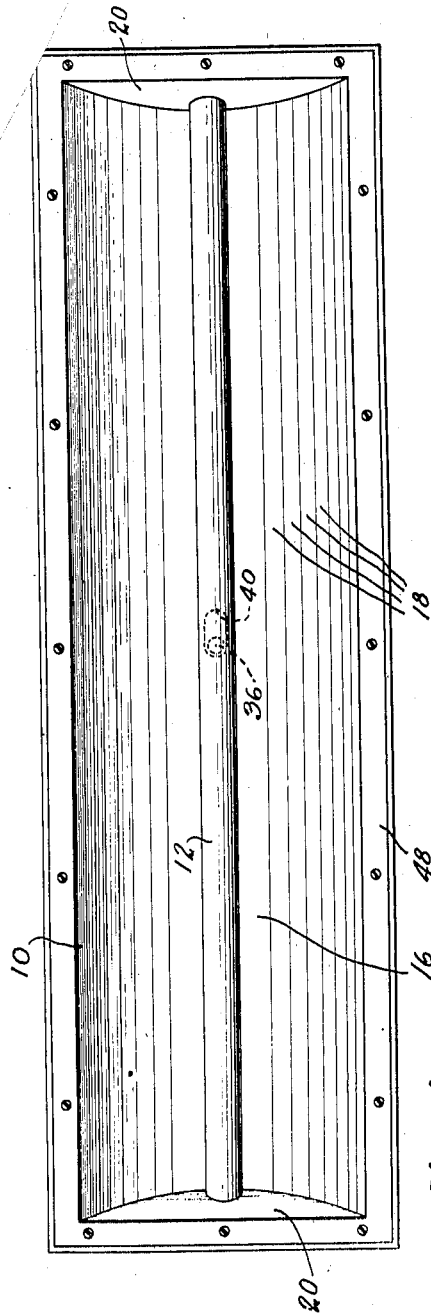
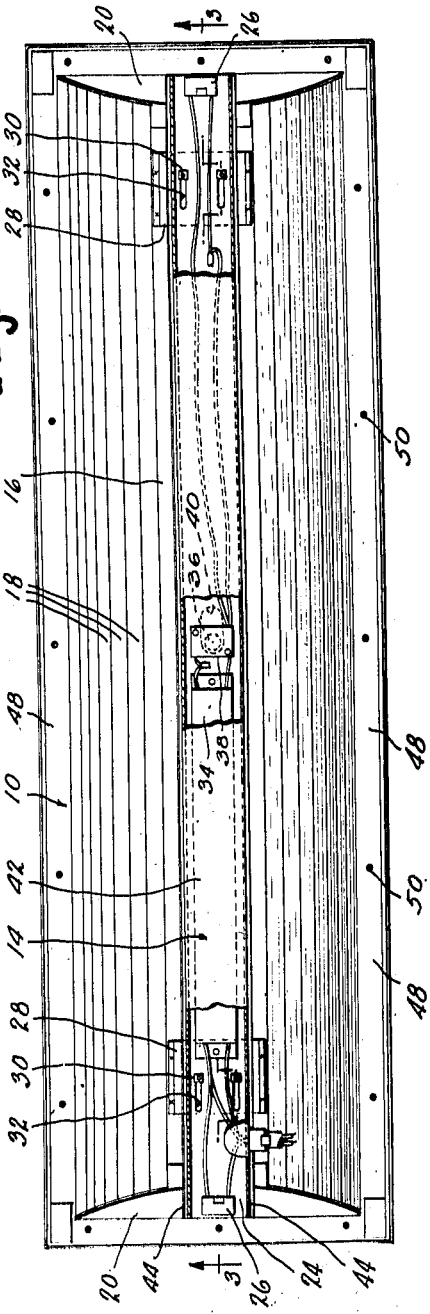
INVENTOR.
Ralph B. Netting
BY Parker and Burton
Attorneys Jan. 11, 1944.　　　R. B. NETTING　　　2,339,100
LIGHT FIXTURE
Filed April 28, 1941　　　4 Sheets-Sheet 2
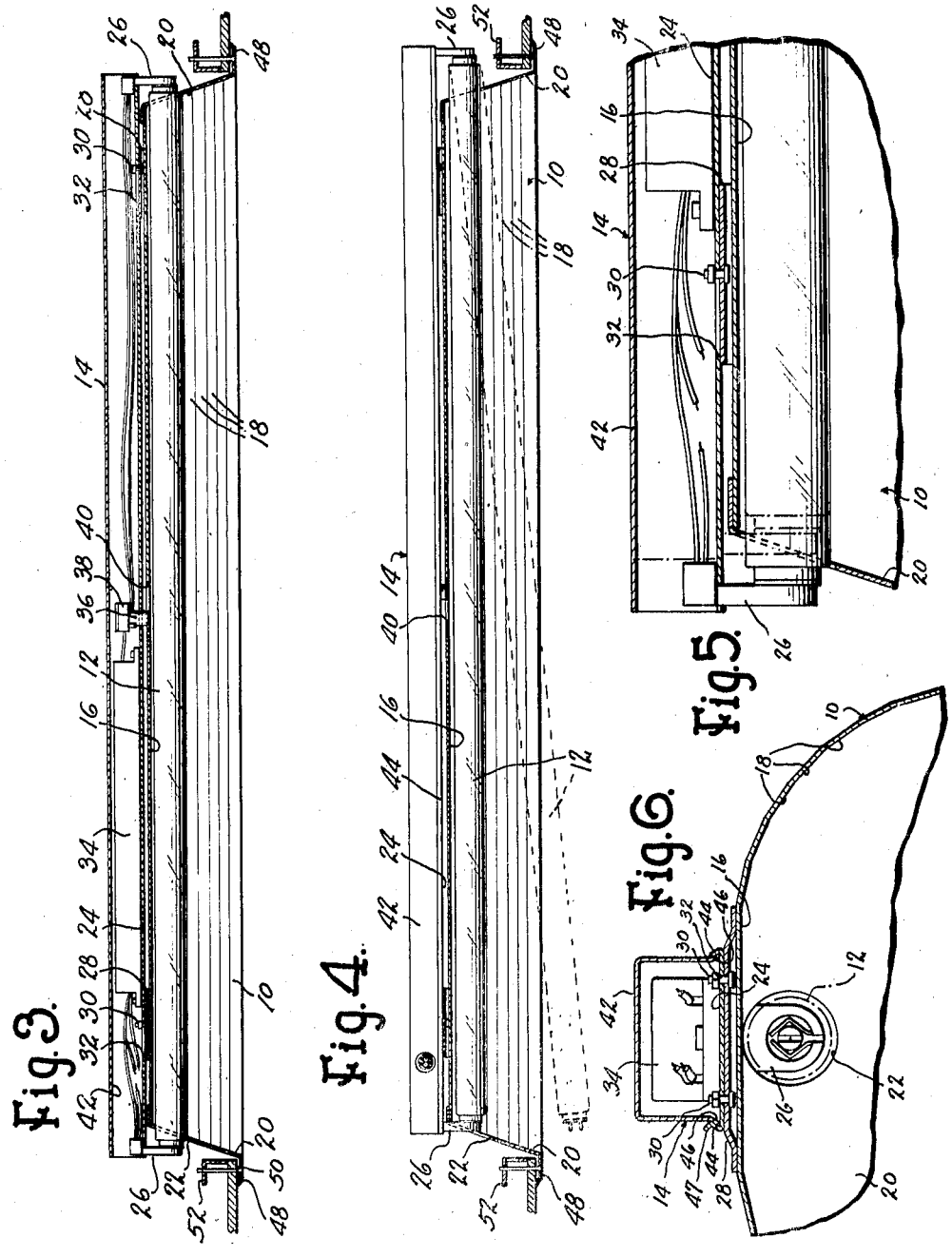
INVENTOR.
Ralph B. Netting
BY Parker and Burton
Attorneys Jan. 11, 1944.  R. B. NETTING  2,339,100
LIGHT FIXTURE
Filed April 28, 1941  4 Sheets-Sheet 3
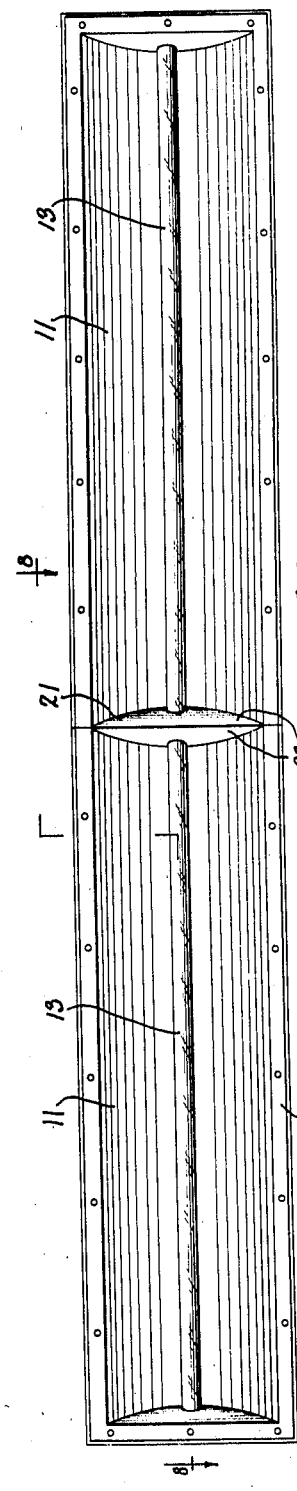
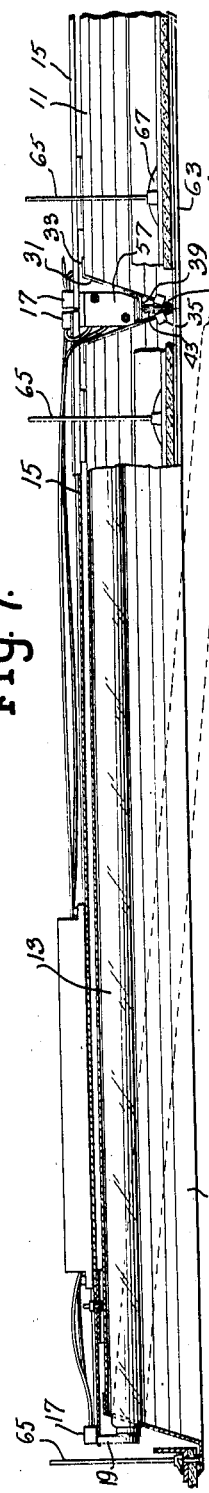
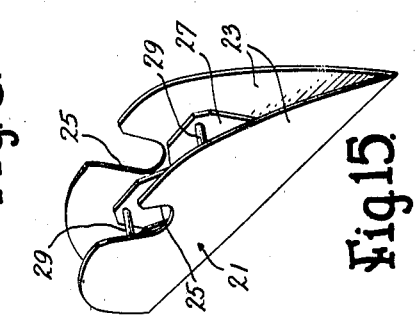
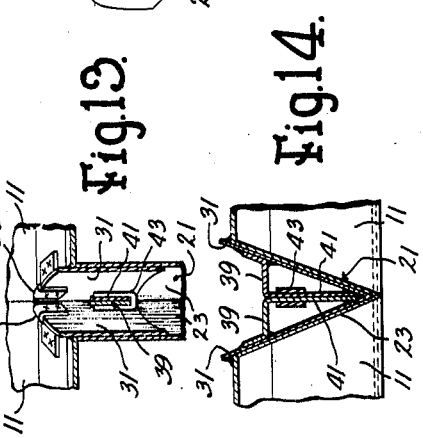
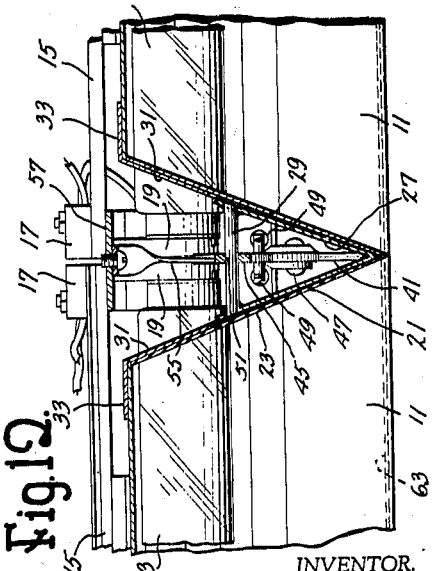
INVENTOR.
Ralph B. Netting
BY Parker and Burton
Attorneys Jan. 11, 1944.　　　　R. B. NETTING　　　　2,339,100
LIGHT FIXTURE
Filed April 28, 1941　　　　4 Sheets-Sheet 4

INVENTOR.
Ralph B. Netting
BY Parker and Burton
Attorneys

Patented Jan. 11, 1944

2,339,100

UNITED STATES PATENT OFFICE 2,339,100

LIGHT FIXTURE

Ralph B. Netting, Grosse Pointe, Mich.

Application April 28, 1941, Serial No. 390,682

4 Claims. (Cl. 240—78)

This invention relates to improvements in lighting fixtures and particularly to improvements in fluorescent luminaries of the type described and claimed in my application for patent of the United States, Serial No. 372,305, filed December 30, 1940.

An important object of this invention is to provide improvements in the mounting of fluorescent lamps or the like in reflector units and particularly in the type of reflector unit described in my aforesaid patent application. Another important object of this invention is to provide a novel support for fluorescent tubes which enables the tubes to be assembled and removed from the reflectors without having to gain access to the back side of the reflectors or perform time consuming operations such as the removal of parts of the reflector for this purpose. More particularly, it is an important object of this invention to provide a novel mounting on a lighting fixture for receiving and supporting fluorescent tubes and the like which conceals the lampholders and the non-luminous terminal ends of the tubes from view and yet permits ready removal and attachment of the lamps from the front or reflecting side of the fixture.

In one embodiment of the invention illustrated herein, the novel form of support for the fluorescent lamp permits limited bodily shiftable movement of the lamp relative to the reflector to effect removal and attachment. A novel feature of this improvement is the arrangement whereby the non-luminous ends of the lamp are projected into apertures in the opposite end walls of the reflector unit and concealed thereby, yet is capable as a result of the shiftable movement to be quickly withdrawn from the apertures without adjustment or alteration of the reflector or gaining access to the back side of the reflector.

In another form of the invention illustrated herein, the lampholders and the non-luminous terminals of the fluorescent lamps are concealed from view by novel removable sections of the reflectors. These sections are in the form of covers or housings which, when disposed in the reflector, appear as end walls dividing one reflector unit from another. An important novel feature of this structure is the provision for releasably holding the removable covers or housings against the reflector in position over the lampholder to conceal the latter from view. Novel fastening means is employed which is self-operable in character, is concealed entirely from view, and requires no greater effort than to place the cover in position or remove the same therefrom in order to effect attachment or removal.

An important feature of this form of the invention is the provision of novel means for quickly attaching and detaching the covers from the front side of the reflector and without the necessity of gaining access to the back side of the reflector for this purpose. The novel attaching means is self-operable to draw the covers or housings to the reflector and hold it from accidental detachment therefrom.

Figure 10:
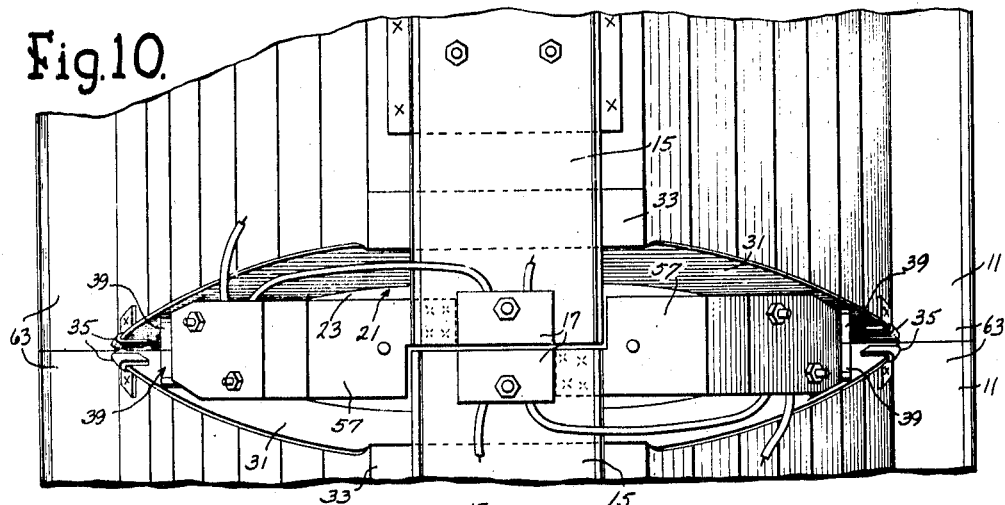
Figure 11:
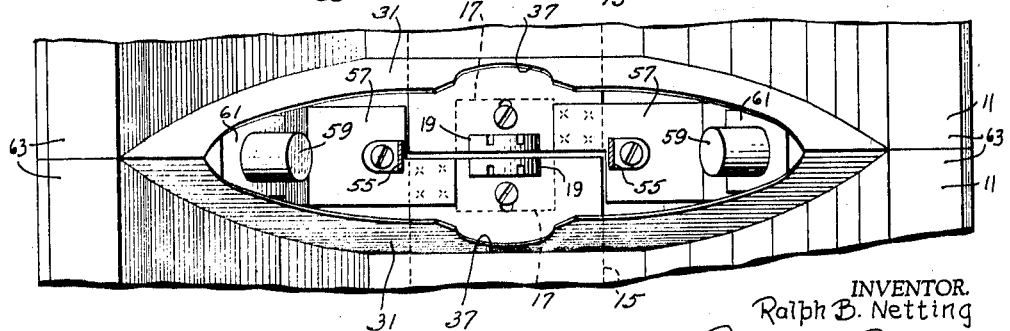

The above objects and others will more fully appear from the following specification, appended claims and accompanying drawings, wherein:

Figure 1 is a plan view of the reflector and lamp mounted therein,

Fig. 2 is a view of the back of the reflector showing the support for the lamp partially broken away to expose the interior construction, Fig. 3 is a longitudinal sectional view along lines 3—3 of Fig. 2, Fig. 4 is a view similar to Fig. 3 but showing the manner in which the lamp is mounted and removed from the fixture, Fig. 5 is a detail longitudinal sectional view showing the manner of effecting relative movement between the lamp support and reflector, and Fig. 6 is a detail cross-sectional view for the same purpose as Fig. 5, Fig. 7 is a modified form of reflector assembly showing in plan view the association of two reflector units mounted end to end, and Fig. 8 is an enlarged view of part of the assembly in Fig. 7 along line 8—8 thereof, Fig. 9 is a cross-sectional view through the assembly of Figs. 7 and 8 at the juncture of the two reflector units showing in dotted line the detachable character of a transverse wall member, Fig. 10 is a back view of the assembly of Fig. 7 at the juncture of the two reflector units, Fig. 11 is a front view of the connection between the two reflector units with the transverse wall member removed, Fig. 12 is a sectional view along line 12—12 of Fig. 9, Fig. 13 is a detail sectional view along 13—13 of Fig. 9, Fig. 14 is a detail sectional view along line 14—14 of Fig. 9, and Fig. 15 is a perspective view of the removable transverse wall members.

The reflector unit in the form of the invention illustrated in Figs. 1 to 6 inclusive comprises a reflector 10, an elongated lamp 12 and a support for the lamp generally indicated on the backside of the reflector at 14. As described in the aforesaid patent application, the reflector is generally concave. The base portion 16 is relatively wide and flat, and extends the length of the reflector. The lamp 12 is mounted parallel and closely adjacent to the base portion. The sides of the reflector are subdivided into a plurality of relatively narrow longitudinally extending flat strips 18 each extending at a progressively greater angle to the base portion as the outer ends of the reflector are reached. This has the effect of blending the light source and eliminating shadow lines and contrasting light and dark areas as described in my earlier application. End walls 20 are provided on the reflector. Each end wall is apertured at 22 to receive an end of the lamp. As shown, the lamp 12 has a length slightly greater than the length of the flat base portion 16. The end walls are arranged to slant outwardly away from one another and the base portion as indicated in Fig. 3.

The ends of the lamp are usually of metal construction and serve as terminals for the conduction of electric current to the lamp. They are, of course, non-luminous and in use will form shadows or darkened areas. As described in my aforesaid application, the ends of the lamp extend into the apertures in the end walls and are concealed from view as Fig. 1 indicates. The incline of the end walls reflects the light of the lamp in a way to create an illusion that the luminous section of the lamp overlaps upon the end walls.

The lamp support, generally referred to at 14, comprises an elongated base plate 24 extending the length of the reflector and projecting beyond the opposite ends of the base portion 16 of the reflector. Mounted on the ends of the base plate are lampholders or sockets 26. These extend forwardly in alignment with but slightly spaced from the apertures 22. These sockets are of conventional construction and each includes a circular slot and diametric slot. The ends of the lamp are shaped with a pair of terminals adapted first to be inserted into the diametric slot and then turned into the circular slot to complete the electrical connection. When thus mounted, the tubular lamp is supported closely adjacent to the base portion 16 of the reflector but slightly spaced therefrom.

Adjacent the ends of the reflector, the base portion 16 thereof is provided with two brackets 28—28 of flat metal stock which have their central body portion slightly spaced from the base 16 as shown in Fig. 6. Extending through the base plate 24 of the lamp support and the brackets 28 are suitable fastening devices such as a bolt and screw assembly indicated at 30. All of the holes through which the fastening means extends are slotted longitudinally of the reflector. In the present embodiment of the invention the openings in the base of the lamp support 24 through which the bolts extend are in the form of slots as indicated at 32. These slots extend parallel to the longitudinal dimension of the fixture. As is readily apparent, these slots permit limited longitudinal bodily movement of the lamp support relative to the reflector. After the nuts have been threaded on the bolts of the fastening devices, it is preferred to peen or damage the exposed threads so that the nuts can only be loosened far enough to give the desired clearance for permitting shiftable movement of the lamp support.

The relation of the slots 32 to the fastening devices is such that when the lamp support is shifted as far as it will go in one direction, the lamp sockets 26 are disposed in equally spaced relation to the end walls of the reflector as shown in Fig. 3. When the base support, however, is shifted to the opposite end of its movement, one socket is advanced partially through the aperture 22 of the end wall behind which it is mounted as shown at the left of Fig. 4. In this position the tubular lamp 12 can be grasped and quickly removed from the socket as indicated in dotted outline by first withdrawing the left end and then pulling out the right end of the lamp.

The reverse operation takes place when a lamp is assembled in the reflector. Considering Fig. 4, the lamp is grasped by one or both hands and the right end of the lamp inserted into the hole provided in the right end wall of the reflector and secured in the socket. The left end is then swung into the left socket. The lamp may be turned to releasably lock it in position and to complete the electrical connection. The lamp is then bodily shifted to the left carrying the sockets and the lamp support therewith until the fastening devices 30 strike the other ends of the slots 32. This will dispose the lamp and lamp support in central position as shown in Fig. 3 with the sockets and lamp ends concealed from view.

If the lamp is of the fluorescent type, the various controls associated therewith may be mounted on the base 24 of the lamp support. As shown in Figs. 2, 5 and 6, the conventional transformer ballast unit 34 may be secured directly to the base plate 24. A conventional starter switch control unit which functions to impede the full effect of the electric current on the lamp is shown at 36 at substantially the middle of the fixture. Heretofore this unit has been disposed adjacent one of the lampholders at a rather inaccessible position. Since these units wear out from time to time they must be replaced. A novel feature of the present invention is the location of such a unit 36 along an intermediate section of the fixture and the provision of means enabling this unit to be reached from the reflecting side of the fixture without removing or adjusting any part of the reflector or lamp support.

The control unit 36 is normally supported in a socket in a base 38. It is usually cylindrical and when attached is first inserted into the socket in the base and then turned to releasably lock it in position. The base 38 in the present invention is supported by standards or otherwise in spaced relation to the rear side of base plate 24 of the lamp support as shown in Fig. 3. Aligned holes are provided in the base plate 24 and the base portion 16 of the reflector. The hole 40 in the latter is elongated in a longitudinal direction as shown in Fig. 1. The end of the control unit 36 will thus be accessible through the opening 40 in no matter what position the lamp support is shifted. Normally, as shown in Fig. 1, the lamp 12 conceals the opening 40 and the end of the unit 36 from view.

As shown, electric wires lead from the various control units to the sockets to complete the circuit. The units and the wires on the rear side of the base plate 24 may all be housed with a cover 42 of general channel shape. Preferably, the base plate 24 is provided with marginal flanges 44—44 slightly inturned as shown in Fig. 6. The outer margins 46 of the cover 42 are turned out for snapping the cover into engagement with the inturned flanges 44 of the base plate to hold the cover in place. One of the inturned flanges 44 of the base plate is provided with an outwardly extending lip 47 which may be engaged by the fingers for flexing the flange out to release the cover.

The fixtures may be supported in various ways upon the ceiling or walls of a building. In the illustration in the drawings the reflector 10 may be provided with outwardly extending marginal flanges 48 provided with holes 50. These flanges and the holes therein may be used to secure the fixture to angle bars 52 or similar supports forming the base for a false ceiling or wall. Other ways of supporting the fixtures are apparent and the invention is applicable to any suitable means employed.

In the form of the invention illustrated in Figs. 7 to 15, inclusive, the general construction and relation of the parts of the reflector units is the same as that previously described. However, in this embodiment of the invention, a novel form of detachable cover or housing is employed to conceal the lamp holders and the non-luminous terminal ends of the lamps. When assembled the housing has the appearance of two inclined end walls brought out in abutment as shown in Figs. 4, 5 and 12 of my earlier application for patent. Novel means concealed from view is employed for holding these housings against the reflecting surface, which means is self-operable and requires no time consuming fastening or unfastening operations to gain access to the lamp holders and other auxiliary units of the lighting circuit.

Referring specifically to Figs. 7 to 15, two reflector units 11—11 are shown assembled end to end to form one long channel or trough shape reflector. More units than two may of course be added if desired. Mounted in each reflector as previously described is a fluorescent lamp 13. Extending along the back side of each reflector is a supporting member 15 which, as in the previously described modification, carries lampholders or sockets which project to the front of the reflector at the opposite ends and receive the ends of the fluorescent tubes. Each lampholder has a widened base portion 17 which bears against the back side of the supporting member 15 and secured thereto and a narrower part 19 having the customary electric terminals extending forwardly through a cut out in the reflector and projecting from the base portion thereof. When two or more reflector units are thus assembled end to end, at each connection there is a pair of lamp holders or sockets disposed back to back as shown in Fig. 12.

In the previous described modification, apertured end walls closed the ends of the channel of each reflector unit. These walls formed fixed parts of the assembly unit and the support for the fluorescent lamps permitted a longitudinally bodily movement in order to remove and install the lamps. In the present modification, the end walls are removable to expose the lamp holders concealed thereunder. The end walls of two joined reflector units incline toward one another and abut along a line extending transversely to the longitudinal dimension of the reflector channels to form a V-shaped housing fitting the cross-sectional configuration of the channel. Such a formation is preferred as described in my earlier application to reflect the light of the lamps in such a way that to the casual glance there are no dividing end walls but one continuous channel and tube running the length of the reflector units assembled. However, it is to be understood that this invention is not restricted to a V-shaped housing but may be of any other formation to suit the purpose of the designer.

In Fig. 15 I show a V-shaped housing or cap 21 which is adapted to be mounted crosswise in the channel of the reflector assembly and serve in place of the fixed end walls of two joined reflector units. This housing is preferably formed of one flat piece of sheet metal stock bent to form two side walls 23—23 which are shaped to enter the channel of the reflectors and fit snugly therein. Each side wall is apertured or cut out at 25 so that when the housing is assembled in place the walls may straddle the end of a fluorescent tube. The walls incline away from one another at the proper angle to give the desired reflection. Preferably the side walls of the housing 21 are of such a depth that when fitted snugly in the reflector channel they dispose the apex of the housing on the level even with the outside edges of the reflector units as shown in Fig. 12.

Carried within the cover or housing 21 is a smaller V-shaped member 27 which is preferably soldered or otherwise secured to the inside surfaces of the side walls 23—23. Connecting the side walls of the smaller V-shaped member are two spaced apart pins 29—29 which, as will be later described, cooperate with a novel device on the reflector units to secure the housing 21 in place.

The channels of each reflector unit 11 terminate on an incline corresponding to the inclination of the side walls 23—23 to the vertical. That is to say, the side marginal portions of each reflector project beyond the intermediate side portions and the base portion, and the latter two terminate progressively inwardly on an incline equal to the angle of the side walls 23 to the vertical. As a result, when two reflector units are assembled end to end a triangular space is formed substantially equal to the triangular area encompassed by the cover 21. This space is bridged by the back supporting members 15 of the two units which jut out from the recessed base portions of the reflectors as shown in Fig. 12. The lampholders carried on the ends of the supporting members 15 project into this space and into alignment with the cut outs 25 in the side walls of the housing 21.

Along the edge of each end of the reflector is a strip of metal 31 which forms an inturned flange extending part way into the channel of the reflector from the base portion and the opposite walls thereof as best shown in Fig. 11. This flange preferably extends at the same angle to the vertical as the side walls of the cover 21. Each strip 31 has an added portion 33 which is bent to overlie the back side of the flat base reflector and may be welded thereto. Welded clips 35 as shown in Figs. 9, 10 and 13 may also be used to secure the ends of the strips to the side portions of the reflectors. The flanges, like the side walls of the cover 21, are provided with cut outs 37 for receiving the ends of the fluorescent tubes. As a result of this construction, when the cover 21 is assembled over the joined ends of two reflectors its side walls will slidingly bear upon the flanges and form a tight fit therewith. Preferably the flanges and side walls should be so disposed with respect to one another that one or other or both are flexed slightly as the cover 21 is moved into place. This is important because if a loose fit occurs at this point a distinct shadow will be formed between the free edges of the side walls and the reflector which would detract from the desired harmonious blending of original and reflected light.

To hold the reflector units together and in proper alignment particularly during their installation on a wall or ceiling, each flange 31 is provided with two outwardly projecting metal brackets 39 each having a vertical part 41 extending substantially flush with the end of the reflector unit. These brackets are welded or otherwise secured to the flange 31 on opposite sides of the supporting member 15. They are mounted on corresponding positions on each reflector unit so that when one unit is brought into end abutment with another the parts 41 of each bracket are brought into engagement as shown in Fig. 14. To hold the reflector units from separation, U-shaped clips 43 are used to straddle the engaging portions of the brackets as shown in Figs. 13 and 14. The clips frictionally grip the brackets and are easy to install and remove. Other supporting means to be described hereinafter are used to secured the reflectors in position on the wall or ceiling.

As previously mentioned, novel means is employed to fasten or connect the covers or housings 21 to the reflectors. This means is entirely concealed from view after the housings 21 are assembled in place. Moreover, this fastening means permits instantaneous removal and attachment of the cover and all that is required is the act of moving the cover into position or a slight manual force to detach the cover. The novel fastening is self-operable and upon disposing the cover or housing in proper position over the ends of the reflector units will draw the cover to the reflector and hold it against accidental detachment.

Referring particularly to Fig. 9, the novel device for securing the cover or housing 21 in place over the abutting ends of the reflectors is in the form of a toggle joint having spring means which in certain positions functions to draw the arms of the toggle toward the reflectors. The arms of the toggle joint are indicated 45—45. They are similarly formed and pivoted about a common center 47. These arms are connected by a coil spring 49 tensioned to swing the arms toward one another depending on which side of the pivotal axis the spring is on. Each arm is provided with a longitudinal slot 51 opening out through the free end thereof. The two tines on each arm formed by the slot 51 extend unequal lengths, the one nearest the reflecting surface projecting beyond the other as shown.

The dotted and the full lines in Fig. 9 show two operating positions of the toggle joint and the cover 21, the full lines showing the position assumed by the parts when the cover is held in place against the reflectors, and the dotted position when the cover is either being removed or being advanced toward the reflectors for securement thereto. It is apparent from Fig. 9, that the slots 51 of the arms 45 are disposed to receive the pins 29 on the inside of the cover. It is the function of the longer tine of each arm in the assembling operation to engage the pins and guide them into the slot. The dotted position in Fig. 9 shows the position of the parts just prior to the entrance of the pins 29 into the slots 51. In order to dispose the slots in proper position to receive the pins, stop means is provided for preventing swinging movement of the arms toward one another beyond the desired position. The stop means illustrated is formed by providing two right angle shoulders 53—53 on each arm which, as shown in dotted position, abut one another to hold the arms at the proper angle against the tension of the spring to receive the pins.

In the assembling operation, the cover or housing 21 is grasped in the hands of the operator and forced toward the joined ends of the reflector units and crosswise to their longitudinal dimension. The pins 29—29 carried within the cover first strike the longer tines on the arms 45—45 and then are guided into the slots 51—51 as the cover is forced closer to the reflecting surface. Since the pins are immovably held in the cover, the arms will yield to the force applied and swing upwardly about their pivotal axis At first this movement will be yieldingly resisted by the spring 49, until it passes the pivotal axis, at which time the spring will exert a force drawing the arms together about the axis. By virtue of the fact that the pins 29—29 are within the slots 51—51 the force of the spring will draw the cover into the channel of the reflector and nestle it tightly against the flanges 31 and the reflecting surfaces of the units. During this stage the action is self-operable. The cover is snapped home by the action of the spring and the toggle arms. The spring locks the cover in place against accidental detachment. However, if it is desired to remove the cover, it is a simple operation to grasp the cover and pull it out against the resistance of the spring.

The arms 45—45 are supported in any suitable way on the reflector units. As shown, two metal straps 55—55 extend at an inclination toward one another and join together at a point spaced from the base portions of the reflector and the fluorescent lamps. The meeting ends of the straps are connected together by a pin which serves as the pivot for the arms 45—45. The latter may be mounted on opposite sides of the joined ends of the straps and the shoulders 53—53 bent slightly toward one another for engagement. If desired two springs 49, one on each side of the straps may be used as shown in Fig. 12.

The spaced base ends of the metal straps 55—55 may be fixed to any suitable support. As shown, each reflector unit is provided on its ends with a metal band 57 which overlaps partly into the plane of the abutting reflector. At the connection of two reflector units, the band 57 for one unit is on one side of the assembly and the band 57 for the other unit is on the other side of the assembly as shown in Fig. 10. The inner end of each band 57 is welded or otherwise connected to the back support 15 of its reflector; the outer end is welded to the flange 31 of its reflector at a point near one side margin of the reflector. Each band 57 is bent to follow generally the shape of the reflector as shown in Fig. 9. The base ends of the straps 55—55 are secured to the bands 57 of the two abutting reflector units at points adjacent to the lampholders 17.

The more remote and inclined portions of each band 57 serve as a support for a removable starter switch control unit 59 which is customarily employed in fluorescent lighting fixtures of this character. The socket 61 for such a unit is fixed to the inside of the band as shown in Figs. 9 and 11. One starter unit is employed with each reflector unit. Thus for a connection of this kind where there are only two reflector units joined end to end, there will be two starter units which can be housed with the lampholder under the single removable cover 21. Starter units have to be replaced occasionally and they therefore should be accessible for this purpose. Heretofore they have been rather conspicuous on fixtures of this character and detracted from a pleasing appearance as well as caused dark spots in the reflected light. The important feature of this arrangement is the fact that the starter units are concealed with the lampholders under the cover 21 but are immediately accessible when the cover 21 is removed.

Each reflector unit is generally like that previously described in Figs. 1 and 2 and provided with a marginal flange 63 extending around the unit. However, where the ends of the two units abut, the flange is omitted. This allows the cover 21 to come to a rather sharp apex as shown in Fig. 7. As a result, when the fixture is functioning the original and reflected light from the two abutting reflectors merge without the formation of a dark transverse band. The flanges 63 assist in supporting the units on a ceiling or wall. The units illustrated herein are designed for installation in a ceiling or wall coffer. For quick attachment to ceilings or walls, each reflector unit may be provided with long bolt members 65 having toggle locking clamps 67 which engage the back side of any wall or ceiling support as shown at the left of Fig. 8. This type of fastening means permits the reflector units to be suspended together from the ceiling by the long bolts until all wiring connections are completed, after which the units can be quickly raised into the coffers provided therefor.

The reflector assembly has heretofore been described as being composed of two or more separate reflector units joined end to end. It is perfectly feasible, however, to form one long continuous reflector of channel shape or any other desired shape and mount a plurality of fluorescent lamps in one or more rows in the reflector. The transverse wall sections in the form of covers or housings 21 can be easily applied to such a modified form of reflector. The groups of lampholders and starter unit sockets could be attached directly to the reflector or extend through openings in the reflector for securement to a support in the rear thereof. It is understood the scope of the invention is broad enough to cover such a modification.

What I claim:

1. A light fixture comprising, in combination, a channel-shaped reflector having inside light reflecting surfaces, a separable member extending transversely to the channel of the reflector composed of two spaced walls inclined toward one another from the base of the channel and joining at points remote from the base of the reflector on a line extending transverse to the longitudinal dimension of the reflector, said walls having outside light reflecting surfaces and provided with cut out sections to receive fluorescent lamp means disposed longitudinally in the channel of the reflector, and means disposed between the spaced walls of said member connecting said member with the reflector for support thereby and including spring mechanism exerting a tension tending to draw the member toward the reflector and releasably hold the former against the latter.

2. A fluorescent light fixture comprising, in combination, a channel-shaped reflector having inside light reflecting surfaces, a pair of terminal sockets projecting from the base of the channel of the reflector side by side and facing opposite one another longitudinally of the channel to receive the terminal ends of fluorescent lamps and support the latter longitudinally in the channel of the reflector, a housing adapted to extend transversely to the longitudinal dimension of the channel and enclose the two terminal sockets therewithin, said housing formed by two plates inclined to one another and meeting at a substantially knife-like common edge spaced from the base of the channel of the reflector and extending transversely to the reflector, said plates having the general configuration of the transverse dimension of the channel so as to snugly fit therewithin and provided with cut out portions through which the ends of fluorescent tubes may extend to be received and supported by said sockets, and means concealed by the two plates of the housing for releasably holding the housing to said reflector.

3. A fluorescent light fixture comprising, in combination, a channel-shaped reflector having inside light reflecting surfaces, a plurality of lampholders projecting into the channel and facing longitudinally of the channel to receive the terminal ends of fluorescent lamps and support the latter longitudinally in the channel, said lampholders arranged in pairs at spaced intervals in the channel and the lampholders of each pair facing away from one another to receive the ends of two fluorescent lamps, a cover member for each of said pairs of lampholders having outside light reflecting surfaces, and means located within the cover member securing the same to the reflector including spring urged toggle mechanism carried by the reflector and coupled with the cover-member urging the cover-member toward the reflector.

4. A fluorescent light fixture comprising, in comibnation, a channel-shaped reflector having a plurality of sets of fluorescent lampholders projecting into the channel of the reflector, each set comprising a pair of spaced apart lampholders adapted to receive the opposite ends of a fluorescent lamp and support the same in the channel of the reflector, said sets arranged in the reflector with the lampholder of one set back to back with a lampholder of the adjacent set, a plurality of sockets for receiving electrical starter units for the fluorescent lamps projecting into the channel of the reflector and arranged in close proximity to the lampholders, a transverse wall section for each pair of adjacent lampholders forming a separate part of the reflector and having spaced sides which are shaped to enter and snugly fit the inside contour of the channel, each transverse wall section having a relatively hollow interior and adapted to cover a set of lampholders and the electrical starter unit socket associated therewith, the sides of each transverse wall section being spaced apart such a distance and being shaped in such a manner that when the section is properly positioned in the channel of the reflector the sides overlap upon and closely straddle the luminous sections of the fluorescent lamps supported by said lampholders, and fastening means between said wall section and the reflector and self operable to draw the section into position and releasably hold the same against the reflector.

RALPH B. NETTING.